United States Patent
Tschambser et al.

(10) Patent No.: US 11,982,554 B2
(45) Date of Patent: May 14, 2024

(54) METHOD FOR COMMISSIONING A MAGNETIC INDUCTIVE FLOWMETER, AND A MAGNETIC INDUCTIVE FLOWMETER

(71) Applicant: Endress+Hauser Flowtec AG, Reinach (CH)

(72) Inventors: Florent Tschambser, Hesingue (FR); Lars Dreher, Ballrechten Dottingen (DE); Fred Kappertz, Hochwald (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 17/256,485

(22) PCT Filed: May 23, 2019

(86) PCT No.: PCT/EP2019/063411
§ 371 (c)(1),
(2) Date: Dec. 28, 2020

(87) PCT Pub. No.: WO2020/001876
PCT Pub. Date: Jan. 2, 2020

(65) Prior Publication Data
US 2021/0131844 A1 May 6, 2021

(30) Foreign Application Priority Data
Jun. 28, 2018 (DE) .................... 10 2018 115 628.6

(51) Int. Cl.
*G01F 1/60* (2006.01)
*G01F 1/58* (2006.01)

(52) U.S. Cl.
CPC . *G01F 1/60* (2013.01); *G01F 1/58* (2013.01)

(58) Field of Classification Search
None
See application file for complete search history.

(56) References Cited

U.S. PATENT DOCUMENTS

| | | | |
|---|---|---|---|
| 4,117,721 A | 10/1978 | Suzuki et al. | |
| 4,704,908 A * | 11/1987 | Blatter | G01F 1/60 |
| | | | 73/861.17 |

(Continued)

FOREIGN PATENT DOCUMENTS

| | | |
|---|---|---|
| CN | 101263367 A | 9/2008 |
| CN | 102187182 A | 9/2011 |

(Continued)

*Primary Examiner* — Shelby A Turner
*Assistant Examiner* — Brandon J Becker
(74) *Attorney, Agent, or Firm* — Mark A. Logan; Endress+Hauser (USA) Holding, Inc.

(57) ABSTRACT

Disclosed is a method for commissioning a magneto-inductive flow measuring device having means for producing a magnetic field and at least one measuring electrode pair for sensing a potential difference in a medium. The method includes a settling of the means during a settling time for stabilizing the magnetic field. During the settling time a first voltage time function is applied to the means, wherein after the settling time a measuring time begins, wherein during the measuring time a second voltage time function is applied to the means, wherein the settling time is divided into first time intervals, each of which has a duration, wherein the measuring time is divided into second time intervals, each of which has a duration, wherein an average value of all first interval durations is always less than an average value of all second interval durations.

14 Claims, 5 Drawing Sheets

(56) References Cited

U.S. PATENT DOCUMENTS

| | | | |
|---|---|---|---|
| 4,709,583 A | 12/1987 | De Paepe et al. | |
| 6,237,424 B1* | 5/2001 | Salmasi | G01F 1/58 73/861.11 |
| 2003/0213310 A1 | 11/2003 | Brockhaus | |
| 2006/0081067 A1* | 4/2006 | Budmiger | G01F 25/0007 73/861.08 |
| 2009/0015236 A1* | 1/2009 | Foss | G01F 1/60 324/76.11 |
| 2015/0000421 A1* | 1/2015 | Brockhaus | G01F 1/60 73/861.12 |
| 2016/0178419 A1* | 6/2016 | Florin | G01F 1/60 73/861.12 |
| 2016/0290842 A1* | 10/2016 | Budmiger | G01F 1/60 |
| 2017/0097251 A1* | 4/2017 | Dabrowski | G01F 1/582 |
| 2017/0146376 A1* | 5/2017 | Hunter | G01F 1/60 |
| 2019/0226890 A1* | 7/2019 | Kung | G01F 1/586 |

FOREIGN PATENT DOCUMENTS

| | | | | |
|---|---|---|---|---|
| CN | 105865547 A | 8/2016 | | |
| CN | 107068325 A | 8/2017 | | |
| DE | 3314954 A1 | 10/1984 | | |
| DE | 10312058 A1 * | 9/2004 | | G01F 1/60 |
| DE | 10312058 A1 | 9/2004 | | |
| DE | 102004046238 A1 | 3/2006 | | |
| DE | 102015103580 A1 | 9/2016 | | |
| DE | 102016110024 A1 | 11/2017 | | |
| DE | 102016122495 A1 | 5/2018 | | |
| DE | 102016124976 A1 | 6/2018 | | |
| EP | 0809089 A2 | 11/1997 | | |
| EP | 0809089 A2 * | 11/1997 | | G01F 1/60 |
| EP | 0969268 A1 | 1/2000 | | |
| EP | 1275940 A2 | 1/2003 | | |
| JP | 3453751 B2 | 10/2003 | | |
| WO | 2007033697 A1 | 3/2007 | | |
| WO | WO-2007033697 A1 * | 3/2007 | | G01F 1/588 |
| WO | 2015176891 A1 | 11/2015 | | |

* cited by examiner

METHOD FOR COMMISSIONING A MAGNETIC INDUCTIVE FLOWMETER, AND A MAGNETIC INDUCTIVE FLOWMETER

CROSS-REFERENCE TO RELATED APPLICATIONS

The present application is related to and claims the priority benefit of German Patent Application No. 10 2018 115 628.6, filed on Jun. 28, 2018, and International Patent Application No. PCT/EP2019/063411, filed on May 23, 2019, the entire contents of which are incorporated herein by reference.

TECHNICAL FIELD

Magneto-inductive flow measuring devices are applied for determining flow velocity and volume flow of a medium in a measuring tube. A magneto-inductive flow measuring device includes a magnetic field producing means, which forms a magnetic field B extending perpendicularly to the measuring tube axis. Used for such purpose are, usually, one or more coils. In order to implement a predominantly homogeneous magnetic field, supplementally, pole shoes are so formed and applied that the magnetic field lines extend essentially perpendicularly to the measuring tube axis over the total tube cross section. A measuring electrode pair in the wall of the measuring tube senses a potential difference in a direction perpendicularly to the measuring tube axis and perpendicularly to the magnetic field lines. The potential difference arises, when a conductive medium flows in the direction of the measuring tube axis in the presence of an applied magnetic field. Since according to Faraday's law of induction, the sensed potential difference depends on the velocity of the flowing medium, the flow-velocity and, with provision of a known tube cross section, the volume flow of the medium can be ascertained from the potential difference. The potential difference existing between the measuring electrodes is referred to in the following also as measurement voltage.

BACKGROUND

In order to minimize disturbance effects occurring during a feeding phase, usually a voltage with changing polarity is applied to the magnetic field producing means, i.e. to the components for producing a magnetic field. Another proposal for minimizing disturbance effects is disclosed, for example, in DE 102016124976 A1. This proposes a magneto-inductive flow measuring device, which has between polarity changes a resting phase, in which no electrical voltage is applied to the magnetic field producing means. The characteristic of the disturbance effect arising in the resting phase is measured and used for compensating subsequent disturbance effects. In this way, the magnetic field-end value of the measuring phases can be adapted early. Since, however, the magnetic field-end value varies over a number of periods, this adapting must be performed anew for each resting phase and feeding phase.

EP 0969268 A1 discloses a method for controlling the coil current flowing in a coil arrangement, such that by applying a voltage-beginning value before the voltage-end value, wherein the voltage-beginning value is greater than the voltage-end value, occurring eddy currents are compensated, which delay the rising edge of the magnetic field relative to the coil current. In this way, the magnetic field in each half period reaches the magnetic field-end value sooner.

Disadvantageous in these systems is, however, that, while in a half period the magnetic field-end value is reached or ascertained faster, the end value can change as the number of periods increases, until the end value reaches a global steady state condition value. This behavior can be observed especially directly following commissioning of the flow measuring device. In order to achieve a measurement error of less than 0.2%, the magneto-inductive flow measuring device must be left in operation for a number of days. This is especially problematic for magneto-inductive flow measuring devices, which are adjusted directly after commissioning, since the measurement error then gets built into the adjustments.

SUMMARY

An object of the present invention is to provide a method for commissioning a magneto-inductive flow measuring device, which method reduces the settling time for reaching steady state, and to provide a magneto-inductive flow measuring device, which performs such method.

The method of the invention for commissioning a magneto-inductive flow measuring device having means for producing a magnetic field B, wherein an electrical voltage U is applied to the means, in order to produce the magnetic field B, and at least one measuring electrode pair for sensing a potential difference in a medium, is characterized by a settling of the means during a settling time $t_a$ for stabilizing the magnetic field B until $$\left|\frac{B_{actual} - B_{desired}}{B_{desired}}\right| < \Delta,$$

wherein $\Delta$ is less than 0.25%, and especially less than 0.2% and preferably less than 0.05%, wherein $B_{actual}$ corresponds to a magnetic field-end value of a current, actual state of the magnetic field, wherein $B_{desired}$ corresponds to the magnetic field-end value of a steady state condition of the magnetic field, in which for any $B^*(t)$, $$\left|\frac{B^*(t) - B^*(t + 2k \cdot t_{m,j})}{B^*(t)}\right| < 1/1000,$$

wherein k is a natural number greater than or equal to 1000, wherein during the settling time $t_a$ a first voltage time function A is applied to the means for producing the magnetic field, wherein after the settling time $t_a$ a measuring time $t_m$ begins, wherein during the measuring time $t_m$ a second voltage time function M is applied to the means for producing the magnetic field, wherein the settling time $t_a$ is divided into N first time intervals, each of which has a duration $t_{a,i}$ with $i \in [1, 2, \ldots, N]$, wherein the measuring time $t_m$ is divided into second time intervals, each of which has a duration $t_{m,j}$ with $j \in \mathbb{N}$, wherein an average value $\overline{t_{a,i}}$ of all first interval durations is always less than an average value $\overline{t_{m,j}}$ of all second interval durations.

During a single feeding phase, the magnetic field as a function of time or the measurement voltage between the measuring electrodes as a function of time is marked by a settling into a local end state at the beginning of the feeding phase, after which the voltage is essentially constant as a function of time. Upon reaching the local end state, the measuring phase begins. Measured values ascertained during the measuring phase are referred to as end values. For determining flow velocity or volume flow, the magnetic field-end value and the measurement voltage-end value of the particular measuring phase are taken into consideration. With the settling of the means for producing a magnetic field into a steady state condition, the local end state converges to a global end state.

After the commissioning of a magneto-inductive flow measuring device, the magnetic field-end value $B_{actual}$ changes over a number of measuring cycles, until it finally, most often after days, converges to a magnetic field-end value $B_{desired}$ of a steady state condition of the magnetic field. This behavior is especially marked in the case of battery-operated magneto-inductive flow measuring devices. Therefore, magneto-inductive flow measuring devices are typically turned-on 30 minutes before the calibrating, whereby a settling of the magnetic field-producing means is assured and the difference between the magnetic field-end value $B_{actual}$ and the steady state magnetic field-end value $B_{desired}$ is reduced. The method of the invention effects a reduction of the waiting time for reaching the steady state magnetic field using an additional settling time $t_a$ having a distinctive voltage A as a function of time.

For the producing the voltages A and/or M, preferably electronic components disclosed in EP 0969268 A1 are used.

Advantageous embodiments of the invention are subject matter of the dependent claims.

In an embodiment, the applied electrical voltage U changes sign after each first interval duration $t_{a,i}$ and after each second interval duration $t_{m,j}$.

It has been found to be advantageous to have the first interval duration $t_{a,i}$ be less than the second interval duration $t_{m,j}$. Thus, the magnetic field changes sign faster during the settling time $t_a$, so that in a short time more energy is introduced into the means for producing the magnetic field. In this way, the means settles faster and the magnetic field-end value $B_{actual}$ achieves the steady state magnetic field-end value $B_{desired}$ sooner.

In an additional embodiment, the second voltage time function M has a third voltage $U_{m,shot,i}$ and/or a fourth voltage $U_{m,hold,i}$.

In an additional embodiment, the first voltage time function A has a first voltage $U_{a,shot,i}$ and/or a second voltage $U_{a,hold,i}$.

In an additional embodiment, the first interval duration $t_{a,i}$ is characterized by at least a first time $t_{a,shot,i}$, in which the first voltage $U_{a,shot,i}$ is applied, and/or at least a second time $t_{a,hold,i}$, in which the second voltage $U_{a,hold}$ is applied.

It has been found to be advantageous to apply before the measuring time $t_m$ a voltage as a function of time known from EP 0969268 A1 having a $U_{shot}$ and a $U_{hold}$, however, with shorter first interval durations $t_{a,i}$. In this embodiment, the steady-state condition can be achieved sooner, wherein the adapting of the circuit requires only that the length of the interval durations be established anew.

In an additional embodiment, $U_{a,shot,i} \geq U_{a,hold,i}$ and $t_{a,shot,i} \leq t_{a,hold,i}$.

In an additional embodiment, $U_{a,shot,i} \geq U_{a,shot,i+2}$, especially $U_{a,shot,i} > U_{a,shot,i+2}$, wherein $t_{a,shot,i} \leq t_{a,shot,i+2}$.

In an additional embodiment, the i-th first time interval $t_{a,i}$ of the settling time $t_a$ has features as follows:
a. applying the first voltage $U_{a,shot,i}$ for the first time $t_{a,shot,i}$,
b. applying the second voltage $U_{a,hold,i}$ for the second time $t_{a,hold,i}$,
c. changing the sign of the voltage.

In a modified form of the above mentioned embodiment, the applying of the second voltage $U_{a,hold,i}$ is omitted for the second time $t_{a,hold,i}$.

In an additional embodiment, the settling time $t_a$ is less than or equal to 2 h, and especially less than or equal to 30 min and preferably less than or equal to 5 min.

In an additional embodiment, a flow velocity and/or a volume flow of the medium is ascertained based on the potential difference across the measuring electrodes during the measuring time $t_m$, especially during the fourth time $t_{m,hold,j}$ and preferably during a measuring phase, in which the magnetic field B is essentially constant.

During polarity change of the voltage applied to the means for producing the magnetic field, disturbance effects occur, so that after each polarity change a certain time needs to be waited, until the magnetic field reaches its local end state. The time period, in which the magnetic field is steady state and essentially constant, is referred to as the measuring phase. It is part of a feeding phase, in which a voltage is applied to the magnetic field producing means. The resulting magnetic field of the measuring phase is referred to as the magnetic field-end value and serves for determining volume flow of the medium. The potential difference on the measuring electrodes during the measuring phase, i.e. the measurement voltage, is referred to as the measurement voltage-end value.

In an additional embodiment, the second interval duration $t_{m,j}$ is composed of at least a third time $t_{m,shot,j}$, in which the third voltage $U_{m,shot,j}$ is applied, and/or at least a fourth time $t_{m,hold,j}$, in which the fourth voltage $U_{m,hold,j}$ is applied. Thus, the j-th second time interval of the measuring time $t_m$ is composed of features as follows:
a. applying the third voltage $U_{m,shot,j}$ for the third time $t_{m,shot,j}$,
b. applying the fourth voltage $U_{m,hold,j}$ for the fourth time $t_{m,hold,j}$,
c. changing the sign of the voltage.

In an additional embodiment, $U_{a,shot,i} \geq U_{m,shot,j} \geq U_{m,hold,j}$, especially $U_{m,shot,j} > U_{m,hold,j}$.

In an additional embodiment, the first voltage $U_{a,shot}$ and the third voltage $U_{m,shot,j}$ have values greater than or equal to 2V, and especially greater than or equal to 12V and preferably greater than or equal to 60V, wherein the second voltage $U_{a,hold,i}$ and the fourth voltage $U_{m,hold,j}$ have values greater than or equal to 0.4V.

In an additional embodiment, a ratio $t_{m,j}/t_{a,i}$ is greater than 2, especially greater than 4 and preferably greater than 8.

A magneto-inductive flow measuring device of the invention includes an operating unit, which is characterized in that it performs the method of the invention for commissioning a magneto-inductive flow measuring device.

BRIEF DESCRIPTION OF THE DRAWINGS

The invention will now be explained in greater detail based on the appended drawing, the figures of which show as follows.

DETAILED DESCRIPTION

Figure 1:
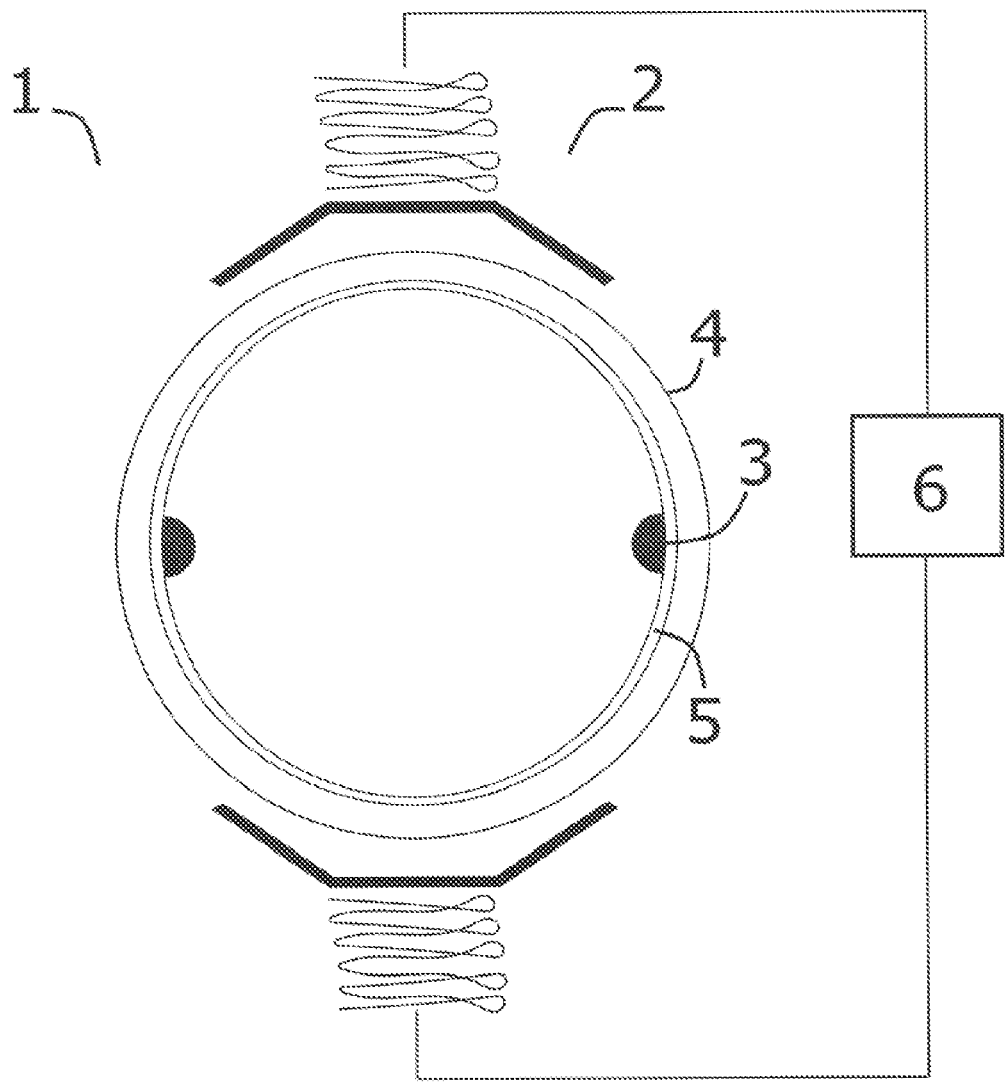
FIG. 1 shows a schematic view of a magneto-inductive flow measuring device of the state of the art.

The construction and measuring principle of a magneto-inductive flow measuring device (see FIG. 1) is basically known. Conveyed through a measuring tube (1) is a medium, which has an electrical conductivity. A magnetic field producing means (2) for producing a magnetic field is so arranged that the magnetic field lines are perpendicular to a longitudinal direction defined by the measuring tube axis. Suited as magnetic field producing means (2) is preferably a saddle coil or a pole shoe with superimposed coil. In the case of applied magnetic field, there arises in the measuring tube (1) a potential difference, which can be sensed with two measuring electrodes (3) provided on the inner surface of the measuring tube. As a rule, these electrodes are diametrically arranged and form an electrode axis, which extends perpendicularly to the magnetic field lines and to the longitudinal direction. Using the measurement voltage sensed by the measuring electrodes, and taking into consideration the magnetic flux density, flow velocity and the tube-cross-sectional area, volume flow of the medium can be determined. For such purpose, the ascertained measurement voltage is evaluated by means of an evaluation unit. In order to avoid corruption of the measurement voltage on the measuring electrodes via a metal tube (4), its inner surface is lined with an insulating material, for example, a liner (5). The magnetic field created by the magnetic field producing means (2) is produced by a clocked, direct current of alternating polarity. This assures a stable zero point and makes the measuring essentially insensitive to influences of multiphase substances, inhomogeneities in the liquid or low conductivity. The voltage applied to the magnetic field producing means is controlled and adjusted via an operating unit (6).

Figure 2:
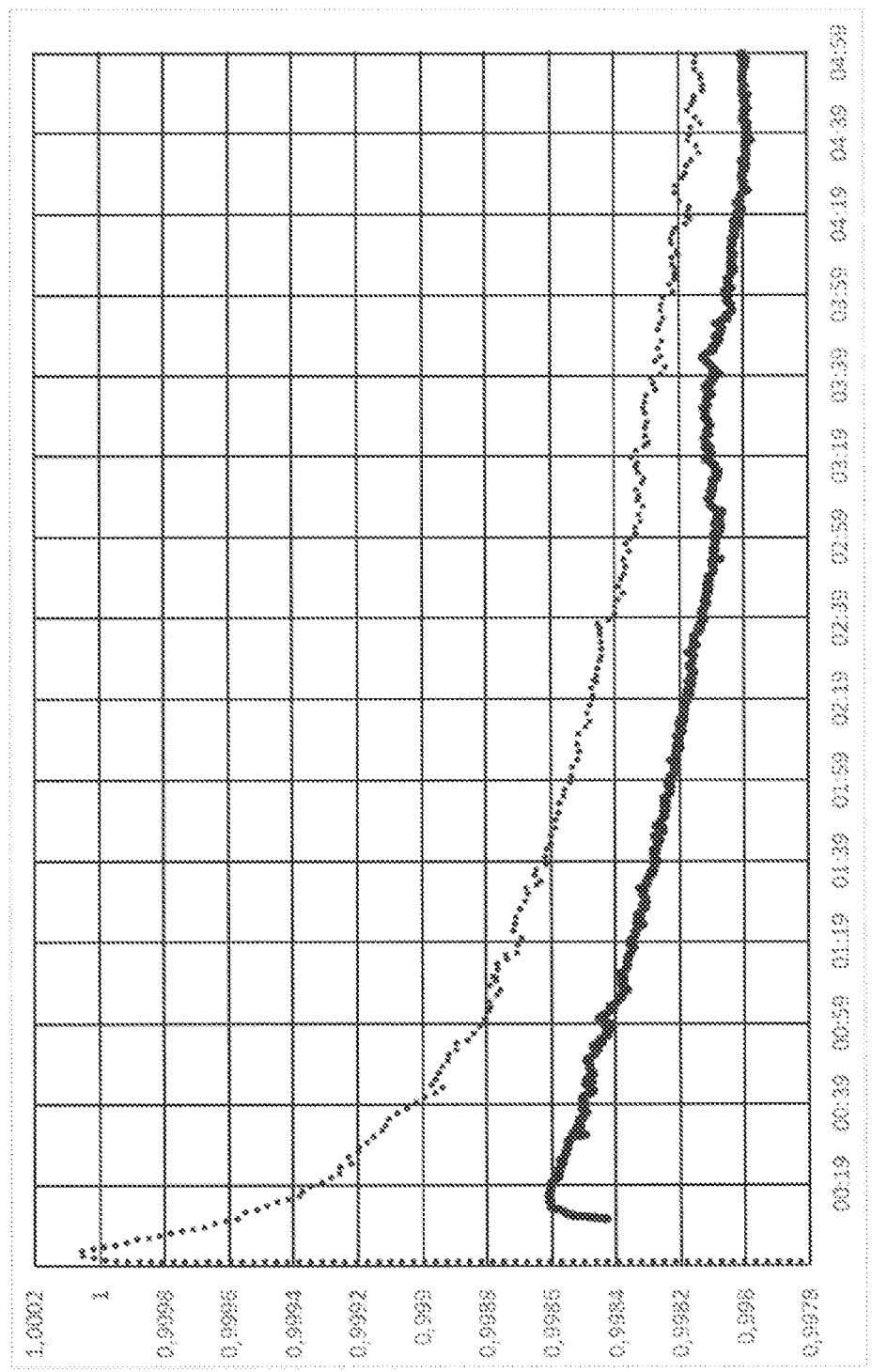
FIG. 2 shows a magnetic field-end value $B_{actual}$ as a function of time over a time range of five hours for a conventionally operated magneto-inductive flow measuring device (dotted curve) and a magneto-inductive flow measuring device operated with the method of the present disclosure (solid curve)

After the commissioning of a magneto-inductive flow measuring device, the magnetic field-end value $B_{actual}$ of the different phases can fluctuate over a number of hours, or a number of days. FIG. 2 shows the relative magnetic field-end value $B_{actual}$ (Y axis) over the course of 5 hours (X axis). The dotted data were taken directly after commissioning of the magneto-inductive flow measuring device and without a settling phase. After commissioning of the magnetic field producing means, the magnetic field-end value measured at the beginning deviates up to 0.2% from the magnetic field-end value ascertained after 5 hours. In such case, the global end state of the magnetic field is still not achieved even after 5 hours. The solid line reflects the data ascertained from a magneto-inductive flow measuring device operated with a ten-minute settling phase. Already at the beginning of the measuring time, the resulting magnetic field-end value $B_{ist}$ deviates by only 0.06% from magnetic field-end value $B_{soll}$ of the steady state condition of the magnetic field.

For ascertaining the magnetic field-end value in FIG. 2, a magnetic field sensor, in this case, a temperature independent pickup-probe, was positioned in the magnetic field center of the magneto-inductive flow measuring device and the resulting magnetic field measured as a function of time. The measurements were performed at room temperature and in the empty state of the measuring tube.

Figure 3:
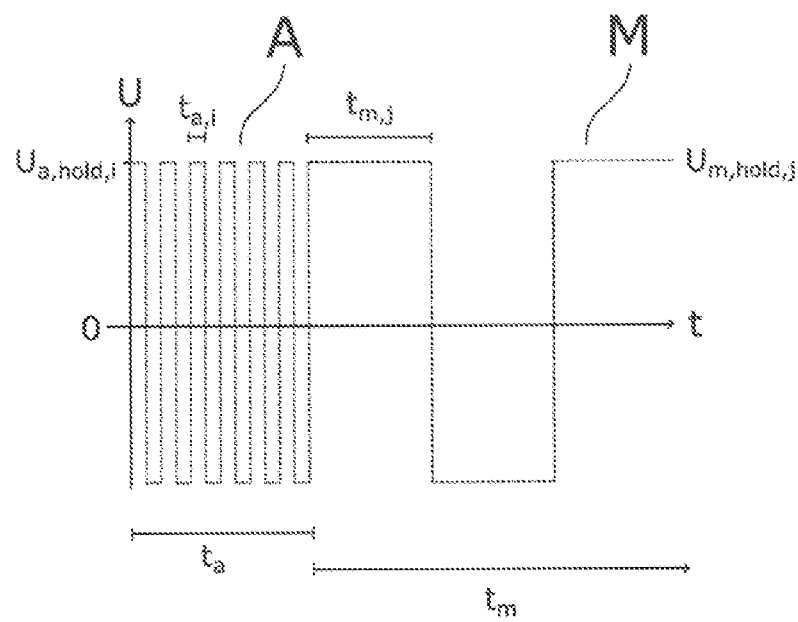
FIG. 3 shows by way of example, voltages A and M as functions of time, wherein $U_{m,hold,j} = U_{a,hold,i}$.

FIG. 3 shows, by way of example, the voltages A and M as functions of time, which last for a settling time $t_a$ and a measuring time $t_m$, respectively In such case, the settling time $t_a$ is divided into 12 first intervals, each with an interval duration of $t_{a,i}$. However, also more, or less, than 12 first time intervals can be used. During the first time interval, there is applied to the magnetic field producing means a voltage U, in this case, a second voltage $U_{a,hold,i}$, whose sign changes at the beginning of each new first time interval (see dotted waveform). The duration of each first time interval is $t_{a,i}$, which is constant for the entire settling time $t_a$ in this embodiment. After the settling time $t_a$, the measuring time $t_m$ begins (see dashed curve), which, in turn, is divided into individual, second time intervals with a second interval duration $t_{m,j}$. During each second time interval, a voltage U, in this case, the fourth voltage $U_{m,hold,j}$, is applied with alternating sign. FIG. 3 shows that the duration of each second time interval $t_{m,j}$ is constant over the total measuring time $t_m$. In such case, according to the invention, the first time interval duration $t_{a,i}$ is less than the second time interval duration $t_{m,j}$. For the two voltage A and M, $U_{a,hold,i} = U_{m,hold,j}$.

An advantage of this first embodiment is that the settled state of the magnetic field producing means is reached faster by the shortening of the interval duration during the settling time $t_a$. Moreover, conventional electronic circuitry can be used for creating the voltages A and M.

Figure 4:
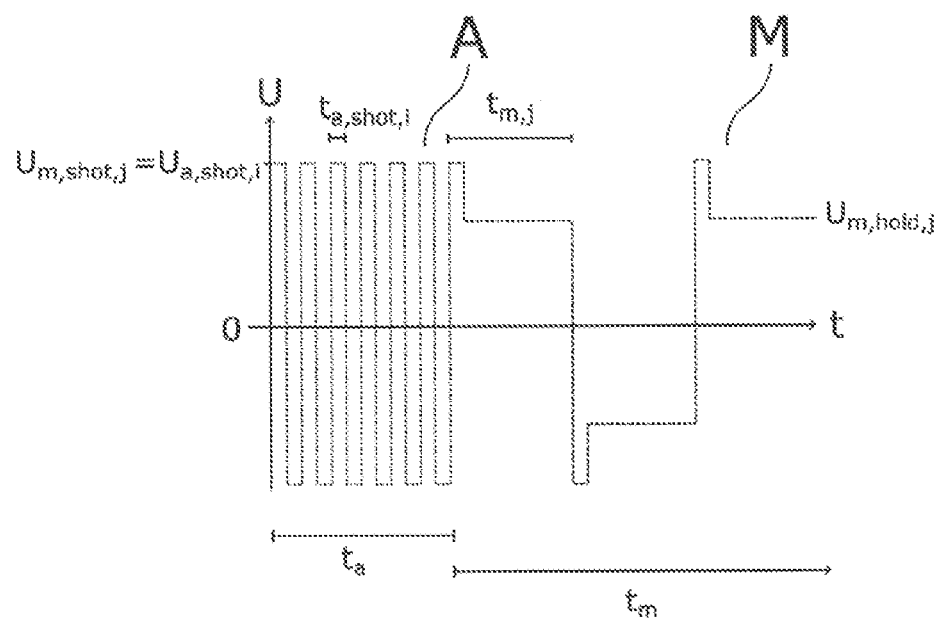
FIG. 4 shows by way of example, voltage A as a function of time and comprising a first voltage $U_{a,shot,i}$, and voltage M as a function of time and comprising a third voltage $U_{m,shot,j}$ and a fourth voltage $U_{m,hold,j}$, wherein $U_{m,shot,j} = U_{a,shot,i}$.

FIG. 4 shows, by way of example, another embodiment of the voltages A and M, which last a settling time $t_a$ and a measuring time $t_m$, respectively. In such case, the settling time $t_a$ is divided into 12 first time intervals. However, more, or less, first time intervals can be used. During each first time-interval, a first voltage $U_{a,shot,i}$ is applied (dotted waveform). After the settling time $t_a$, the measuring time $t_m$ begins, which, in turn, is divided into individual, second time intervals with a second interval duration $t_{m,j}$. These, in turn, divide, in each case, into a third time $t_{m,shot,j}$, in which a third voltage $U_{m,shot,j}$ is applied, and a fourth time $t_{m,hold,j}$, in which a fourth voltage $U_{m,hold,j}$ is applied (see dashed curve). In such case, in this embodiment, the third time $t_{m,shot,j}$ is less than the fourth time $t_{m,hold,j}$ and equals the first time $t_{a,shot,i}$.

In this second embodiment, the second voltage $U_{a,hold,i}$ is not applied during the settling time $t_a$.

Figure 5:
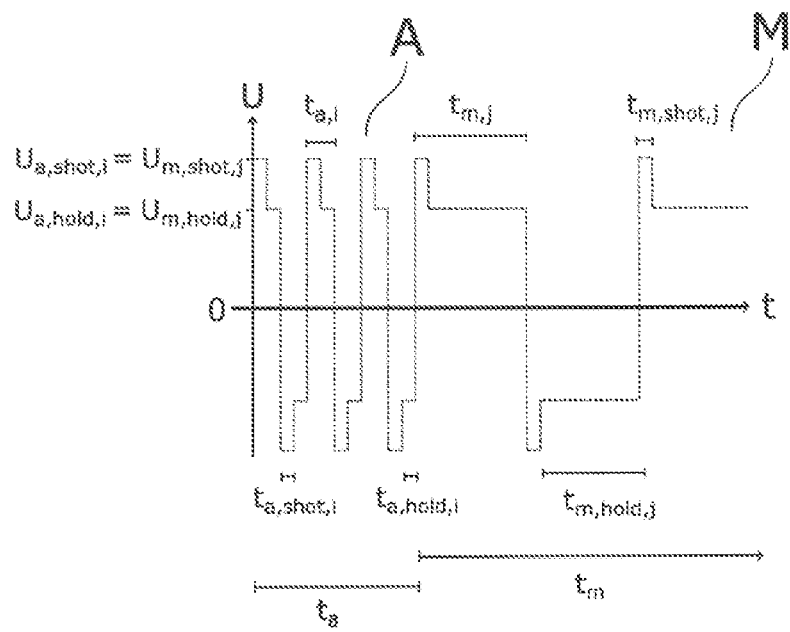
FIG. 5 shows by way of example, voltages A and M as functions of time, wherein voltage A comprises the first voltage $U_{a,shot,i}$ and the second voltage $U_{a,hold,i}$, and voltage M comprises the third voltage $U_{m,shot,j}$ and the fourth voltage $U_{m,hold,j}$, with $U_{a,shot,i} = U_{m,shot,j}$, $U_{a,hold,i} = U_{m,hold,j}$ and $t_{a,shot,i} = t_{m,shot,j}$.

FIG. 5 shows, by way of example, other voltages A and M, which last a settling time $t_a$ and a measuring time $t_m$, respectively. In such case, the settling time $t_a$ is divided into 6 first time intervals. There can, however, also be more, or less, first time intervals. During each first time interval, a first voltage $U_{a,shot,i}$ is applied for a first time $t_{a,shot,i}$ and a second voltage $U_{a,hold,i}$ for a second time $t_{a,hold,i}$ (see dotted curve). This sequence alternates during the total settling time $t_a$. In such case, the first voltage $U_{a,shot,i}$ is always greater than the second voltage $U_{a,hold,i}$. In this example, the first time $t_{a,shot,i}$ equals the second time $t_{a,hold,i}$. The sign changes at the beginning of each new first time interval. The first interval duration $t_{a,i}$ is constant for the total settling time $t_a$. After the settling time $t_a$, the measuring time $t_m$ begins, which, in turn, is divided into individual, second time intervals with a second interval duration $t_{m,j}$. This, in turn, is divided, in each case, into a third time $t_{m,shot,j}$, in which a third voltage $U_{m,shot,j}$ is applied, and a fourth time $t_{m,hold,j}$, in which a fourth voltage $U_{m,hold,j}$ is applied (see dashed curve). This sequence alternates during the total measuring time $t_m$. In such case in this embodiment, the third time $t_{m,shot,j}$ is less than the fourth time $t_{m,hold,j}$ and equals the first time $t_{a,shot,i}$. FIG. 5 shows that the duration of each second time interval $t_{m,j}$ is the same over the total measuring time $t_m$. In such case, according to the invention, the first interval duration $t_{a,i}$ is less than the second interval duration $t_{m,j}$. In this embodiment, the first voltage $U_{a,shot,i}$ equals the third voltage $U_{m,shot,j}$ and the second voltage $U_{a,hold,i}$ equals the fourth voltage $U_{m,hold,j}$.

An advantage of this third embodiment is that the magnetic field-end value $B_{actual}$ reaches the steady state magnetic field-end value $B_{desired}$ sooner than in the first embodiment. A similar voltage as a function of time is known from EP 0969268 A1. Such is applied there during the measuring time $t_m$. Thus, an electronic circuitry of the same type or the same electronic circuitry can be used for the third embodiment.

Figure 6:
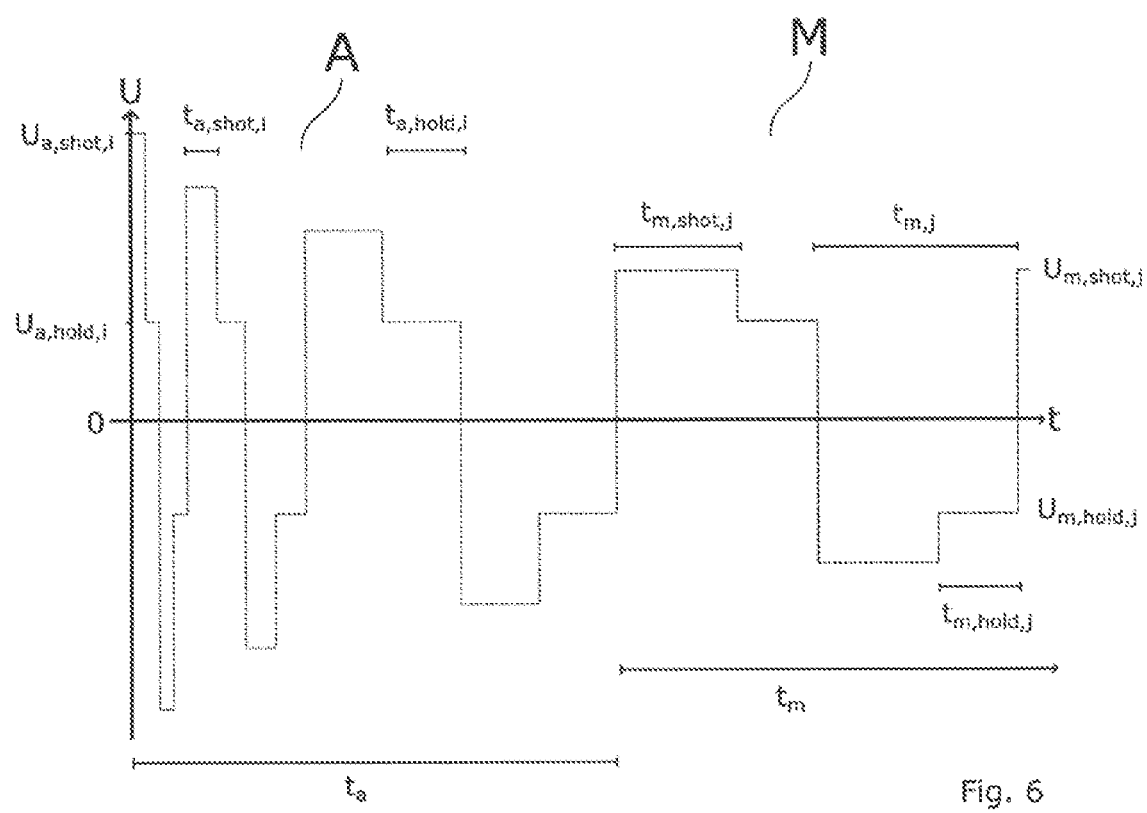
FIG. 6 shows by way of example, voltages A and M as functions of time, wherein voltage A comprises the first voltage $U_{a,shot,i}$ and the second voltage $U_{a,hold,i}$, and voltage M comprises the third voltage $U_{m,shot,j}$ and the fourth voltage $U_{m,hold,j}$, with variable $U_{a,shot,i}$, $t_{a,shot,i}$ and $t_{a,hold,i}$, and with fixed $U_{m,shot,j}$. In this example, $U_{a,hold,i} = U_{m,hold,j}$.

FIG. 6 shows an embodiment of other voltages A and M, which last a settling time $t_a$ and a measuring time $t_m$. In such case, the settling time $t_a$ is divided into 6 first time intervals. There can, however, also be more, or less, first time intervals. During each first time interval, a voltage $U_{a,shot,i}$ and a second voltage $U_{a,hold,i}$ are applied. The first voltage $U_{a,shot,i}$ is greater than the second voltage $U_{a,hold,i}$ and varies over the entire settling time $t_a$. The first voltage $U_{a,shot,i}$ is applied for a first time $t_{a,shot,i}$ and the second voltage $U_{a,hold,i}$ directly after the first voltage for a second duration $t_{a,hold,i}$ (see dotted waveform). Both time periods $t_{a,shot,i}$ and $t_{a,hold,i}$ vary over the entire settling time $t_a$. The sign of the applied voltage U changes at the beginning of each new first time interval. This sequence alternates during the total settling time $t_a$. After the settling time $t_a$, the measuring time $t_m$ begins, which, in turn, is divided into individual, second time intervals $t_{m,j}$. These, in turn, are divided, in each case, into a third time $t_{m,shot,j}$, in which a third voltage $U_{m,shot,j}$ is applied, and a fourth time $t_{m,hold,j}$, in which a fourth voltage $U_{m,hold,j}$ is applied (see dashed curve). This sequence alternates during the total settling time $t_m$. In such case, the third time $t_{m,shot,j}$ is always less than or equal to the fourth time $t_{m,hold,j}$. In this embodiment, the second voltage $U_{a,hold,i}$ equals the fourth voltage $U_{m,hold,j}$ and the first voltage $U_{a,shot,i}$ is greater than or equal to the third voltage $U_{m,shot,j}$. FIG. 6 shows that the interval durations $t_{m,j}$ are constant over the total measuring time $t_m$. In such case, according to the invention, the first interval duration $t_{a,i}$ is less than the second interval duration $t_{m,j}$.

In an additional form of the fourth embodiment, the first voltage $U_{a,shot,i}$ falls with rising period number, until it assumes the value of the third voltage $U_{m,shot,j}$. The first duration $t_{a,shot,i}$ depends on the first voltage $U_{a,shot,i}$. The first duration $t_{a,shot,i}$ falls with increasing first voltage $U_{a,shot,i}$.

Because $U_{a,shot,i} > U_{m,shot,j}$, more energy per unit time is supplied to the magnetic field producing means during the settling time than during the measuring time. In this way, the steady-state condition is reached sooner.

Figure 7:
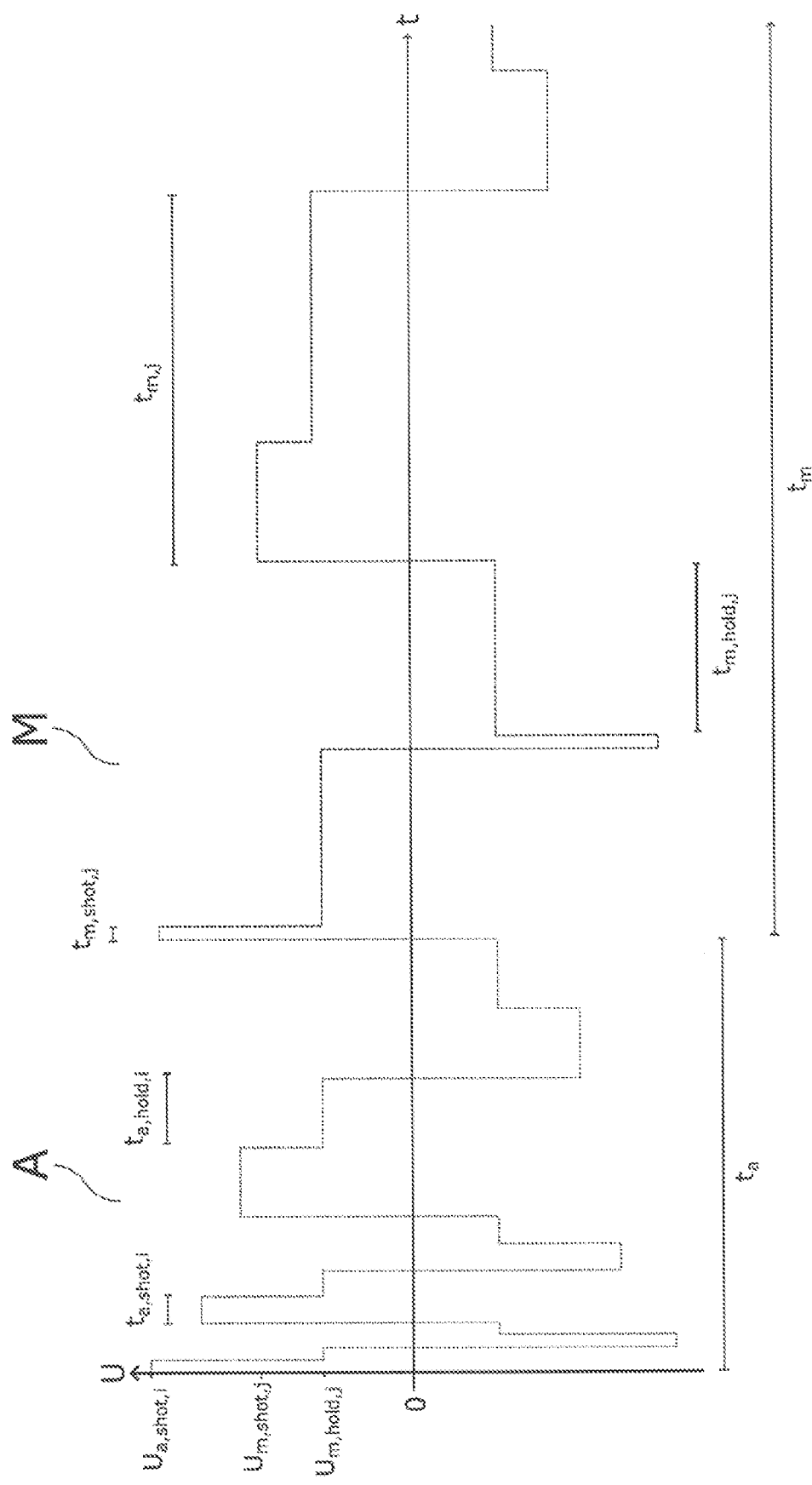
FIG. 7 shows by way of example, voltages A and M as functions of time, comprising variable $U_{a,shot,i}$, $t_{a,shot,i}$, $t_{a,hold,i}$, $U_{m,shot,j}$ and $t_{m,shot,j}$ over the course of several first time intervals, wherein $U_{a,hold,i} = U_{m,hold,j}$.

FIG. 7 shows an embodiment of other voltages A and M, which last a settling time $t_a$ and a measuring time $t_m$. In such case, the settling time $t_a$ is divided into 6 first time intervals, each with an interval duration $t_{a,i}$. More, or less, first time intervals can be used. During each first time interval, a voltage $U_{a,shot,i}$ and a second voltage $U_{m,hold,j}$ are applied. The first voltage $U_{m,shot,j}$ is greater than the second voltage $U_{m,hold,j}$. The first voltage $U_{a,shot,i}$ is applied for a first time $t_{a,shot,i}$, and the second voltage $U_{a,hold,i}$ directly after the first voltage $U_{a,shot,i}$ for a second time $t_{a,hold,i}$ (see dotted curve). Both time periods $t_{a,shot,i}$ and $t_{a,hold,i}$ vary over the entire settling time $t_a$. The sign changes at the beginning of each new first time interval. This sequence alternates during the total settling time $t_a$. After the settling time $t_a$, the measuring time $t_m$ begins, which, in turn, is divided into individual, second time intervals. These, in turn, divide, in each case, into a third time $t_{m,shot,j}$, in which a third voltage $U_{m,shot,j}$ is applied, and into a fourth time $t_{m,hold,j}$, in which a fourth voltage $U_{m,hold,j}$ is applied (see dashed curve). The sign changes at the beginning of each new second time interval. This sequence alternates during the total settling time $t_m$. In such case, the third time $t_{m,shot,j}$ is less than the fourth time interval $t_{m,hold,j}$. In FIG. 7, the second interval duration $t_{m,j}$, especially the third time $t_{m,shot,j}$ and the fourth time $t_{m,hold,j}$, varies over the measuring time $t_m$. In such case, according to the invention, the first interval duration $t_{a,i}$ is less than the second interval duration $t_{m,j}$.

In the above embodiments, the second voltage $U_{a,hold,i}$ and fourth voltage $U_{m,hold,j}$ are selected to be constant. The invention is, however, not limited to a constant second voltage $U_{a,hold,i}$ and a constant fourth voltage $U_{m,hold,j}$. Furthermore, the first, second, third or fourth time do not need to vary over the entire measuring time, or settling time. For example, the settling time $t_a$ can comprise sequences of time intervals, in which the first voltage $U_{a,shot,i}$ increases or decreases with increasing time interval, and time intervals, in which the first voltage $U_{a,shot,i}$ is constant.

In the embodiments, especially in the voltage functions of time A and M in FIGS. 3 to 7, a voltage is assumed, which is constant over a certain time range. All voltage waveforms represent ideal cases, which only hold, when the electrical resistance of the coils is unchangeable, especially temperature independent. It is known that the coils heat during operation, thereby also changing the electrical resistance of the coils. In order to implement a constant magnetic field, a constant coil current must be assured. This is implemented by adjusting the applied coil voltage in the case of resistance change. It is, for example, known that after heating the coils to ~90° C. an adjusting of the applied coil voltage by up to 30% from the beginning value can be required.

The invention claimed is:

1. A method for commissioning a magneto-inductive flow measuring device, comprising:
   providing the magneto-inductive flow measuring device, including:
   a means for producing a magnetic field including a saddle coil or including at least one coil and at least one pole shoe;
   an operating unit including a means for applying an electrical voltage to the saddle coil or the at least one coil to produce the magnetic field; and
   a measuring electrode pair for sensing a potential difference in a medium;
   reducing a waiting time for reaching a steady-state magnetic field by applying for a settling time $t_a$ a first voltage time function to the saddle coil or the at least one coil, wherein the settling time $t_a$ is divided into first time intervals $t_{a,i}$, wherein the first voltage time function changes sign after each first time interval $t_{a,i}$, and wherein the first voltage time function is applied until an end value of the magnetic field differs from a desired value of the steady-state magnetic field by less than 0.25% according to the following inequality:

$$\left|\frac{B_{actual} - B_{desired}}{B_{desired}}\right| < \Delta,$$

wherein $\Delta$ is 0.25%, $B_{actual}$ is the magnetic field end value, and $B_{desired}$ is the desired value of the steady-state magnetic field;

applying for a measuring time $t_m$ following the settling time $t_a$ a second voltage time function to the saddle coil or the at least one coil, wherein the measuring time $t_m$ is divided into second time intervals $t_{m,j}$, wherein an average value of all first time intervals $t_{a,i}$ is less than an average value of all second time intervals $t_{m,j}$, and wherein the second voltage time function changes sign after each second time interval $t_{m,j}$;

measuring during the measuring time $t_m$ a potential difference across the measuring electrodes; and calculating a flow velocity and/or a volume flow of the medium based on the potential difference across the measuring electrodes during the measuring time $t_m$.

2. The method as claimed in claim 1, wherein the second voltage time function has a third voltage $U_{m,shot,j}$ and/or a fourth voltage $U_{m,hold,j}$.

3. The method as claimed in claim 1, wherein the first voltage time function has a first voltage $U_{a,shot,i}$ and/or a second voltage $U_{a,hold,i}$, wherein $U_{a,shot,i} \geq U_{a,hold,i}$.

4. The method as claimed in claim 3, wherein the first interval duration $t_{a,i}$ includes a first time $t_{a,shot,i}$ in which the first voltage $U_{a,shot,i}$ is applied, and/or a second time $t_{a,hold,i}$ in which the second voltage $U_{a,hold,i}$ is applied, and wherein $t_{a,shot,i} \leq t_{a,hold,i}$.

5. The method as claimed in claim 4, wherein $U_{a,shot,i} \geq U_{a,shot,i+2}$.

6. The method as claimed in claim 1, wherein the i-th first time interval $t_{a,i}$ of the settling time $t_a$ has features as follows:

applying the first voltage $U_{a,shot,i}$ for the first time $t_{a,shot,i}$, applying the second voltage $U_{a,hold,i}$ for the second time $t_{a,hold,i}$, and changing the sign of the voltage.

7. The method as claimed in claim 1, wherein the settling time $t_a$ is less than or equal to 2 hours.

8. The method as claimed in claim 1, wherein the second interval duration $t_{m,j}$ is characterized by a third time $t_{m,shot,j}$, in which the third voltage $U_{m,shot,j}$ is applied, and/or a fourth time $t_{m,hold,j}$, in which the fourth voltage $U_{m,hold,j}$ is applied, wherein the j-th second time interval of the measuring time $t_m$ is composed of features as follows:

applying the third voltage $U_{m,shot,j}$ for the third time $t_{m,shot,j}$, applying the fourth voltage $U_{m,hold,j}$ for the fourth time $t_{m,hold,j}$, and changing the sign of the voltage.

9. The method as claimed in claim 8, wherein $U_{a,shot,i} \geq U_{m,shot,j} \geq U_{m,hold,j}$.

10. The method as claimed in claim 2, wherein the first voltage $U_{a,shot,i}$ and the third voltage $U_{m,shot,j}$ have values greater than or equal to 2V, and wherein the second voltage $U_{a,hold,i}$ and the fourth voltage $U_{m,hold,j}$ have values greater than or equal to 0.4V.

11. The method as claimed in claim 1, wherein a ratio $t_{m,j}/t_{a,i}$ is greater than 2.

12. A magneto-inductive flow measuring device, comprising:

a means for producing a magnetic field including a saddle coil or including at least one coil and at least one pole shoe;

an operating unit including a means for applying an electrical voltage to the saddle coil or the at least one coil to produce the magnetic field; and a measuring electrode pair for sensing a potential difference in a medium, wherein the operating unit is configured to:

reduce a waiting time for reaching a steady-state magnetic field by applying for a settling time $t_a$ a first voltage time function to the saddle coil or the at least one coil, wherein the settling time $t_a$ is divided into first time intervals $t_{a,i}$, wherein the first voltage time function changes sign after each first time interval, and wherein the first voltage time function is applied until an end value of the magnetic field differs from a desired value of the steady-state magnetic field by less than 0.25% according to the following inequality:

$$\left|\frac{B_{actual} - B_{desired}}{B_{desired}}\right| < \Delta,$$

wherein $\Delta$ is 0.25%, wherein $B_{actual}$ is the magnetic field end value, and $B_{desired}$ is the desired end value of the steady-state magnetic field;

apply for a measuring time $t_m$ following the settling time $t_a$ a second voltage time function to the saddle coil or the at least one coil, wherein the measuring time $t_m$ is divided into second time intervals $t_{m,j}$, wherein an average value of all first time intervals $t_{a,i}$ is less than an average value of all second time intervals $t_{m,j}$, and wherein the second voltage time function changes sign after each second time interval $t_{m,j}$;

measure during the measuring time $t_m$ interval a potential difference across the measuring electrodes; and calculate a flow velocity and/or a volume flow of the medium based on the potential difference across the measuring electrodes during the measuring time $t_m$.

13. The method of claim 1, wherein the steady state condition of the magnetic field is defined according to the inequality:

$$\left|\frac{B^*(t) - B^*(t + 2k \cdot t_{m,j})}{B^*(t)}\right| < 1/1000,$$

wherein $B^*(t)$ is a value of the magnetic field as function of time, k is an integer greater than or equal to 1000, and $t_{m,j}$ is the second time interval.

14. The magneto-inductive flow measuring device of claim 12,
wherein the steady state condition of the magnetic field is defined according to the inequality:

$$\left| \frac{B^*(t) - B^*(t + 2k \cdot t_{m,j})}{B^*(t)} \right| < 1/1000,$$

wherein $B^*(t)$ is a value of the magnetic field as function of time, k is an integer greater than or equal to 1000, and $t_{m,j}$ is the second time interval.

* * * * *